United States Patent [19]

Winston et al.

[11] 4,038,369

[45] July 26, 1977

[54] METHOD FOR THE ABATEMENT OF HYDROGEN CHLORIDE

[75] Inventors: Steven J. Winston; Thomas R. Thomas, both of Idaho Falls, Ohio

[73] Assignee: The United States of America as represented by the United States Energy Research and Development Administration, Washington, D.C.

[21] Appl. No.: 632,027

[22] Filed: Nov. 14, 1975

[51] Int. Cl.² .......................... B01D 53/34; C01C 1/16
[52] U.S. Cl. ..................................... 423/240; 423/470
[58] Field of Search ............... 423/240, 241, 470, 471; 55/70, 71

[56] References Cited

U.S. PATENT DOCUMENTS

| | | | |
|---|---|---|---|
| 1,725,292 | 8/1929 | Moore et al. | 423/470 |
| 1,776,698 | 9/1930 | Moore et al. | 423/470 |
| 1,987,572 | 1/1935 | Heath | 423/470 |
| 3,322,659 | 5/1967 | Paquet | 423/215.5 |

Primary Examiner—Earl C. Thomas

Attorney, Agent, or Firm—Dean E. Carlson; Frank H. Jackson; Robert J. Fisher

[57] ABSTRACT

The present invention provides a method for reducing the amount of hydrogen chloride contained in a gas stream by reacting the hydrogen chloride with ammonia in the gas phase so as to produce ammonium chloride. The combined gas stream is passed into a condensation and collection vessel and a cyclonic flow is created in the combined gas stream as it passes through the vessel. The temperature of the gas stream is reduced in the vessel to below the condensation temperature of ammonium chloride in order to crystallize the ammonium chloride on the walls of the vessel. The cyclonic flow creates a turbulence which breaks off the larger particles of ammonium chloride which are, in turn, driven to the bottom of the vessel where the solid ammonium chloride can be removed from the vessel. The gas stream exiting from the condensation and collection vessel is further cleaned and additional ammonium chloride is removed by passing through additional filters.

6 Claims, 1 Drawing Figure

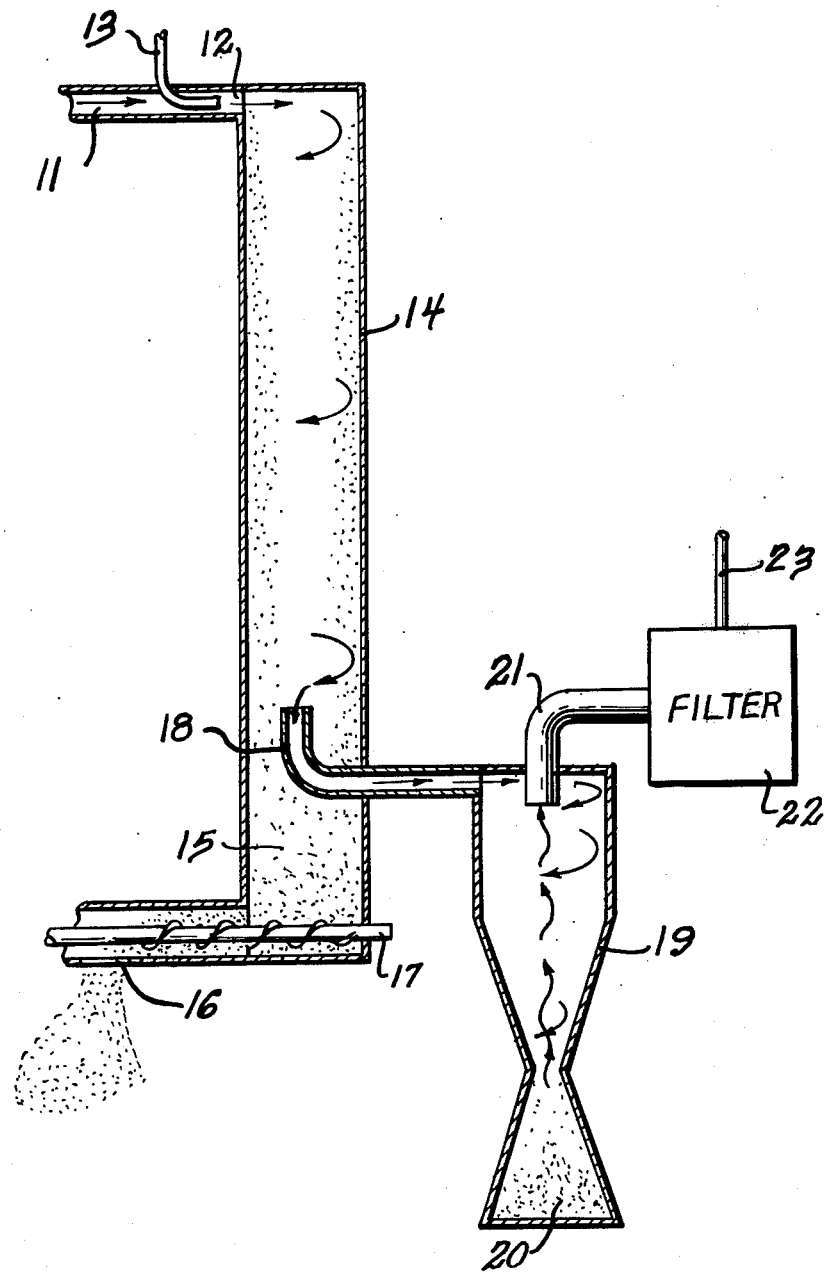

METHOD FOR THE ABATEMENT OF HYDROGEN CHLORIDE

CONTRACTUAL ORIGIN OF THE INVENTION

The invention described herein was made in the course of, or under, a contract with the UNITED STATES ENERGY RESEARCH AND DEVELOPMENT ADMINISTRATION.

BACKGROUND OF THE INVENTION

Hydrogen chloride is often found in gas streams generated during industrial processes and is commonly found in off-gases or waste gases from other sources such as incinerators. For example, while the concentration of hydrogen chloride in the flue gas from municipal incinerators is usually less than 200 ppm, in some cases such as department store incinerators the concentration is as high as 2,000 ppm. A common source of HCl in gas streams is the incineration of industrial or municipal waste containing PVC plastics (polyvinyl-chloride); in fact, it is expected that the PVC waste content in municipal waste will double between the years 1975 and 2000. It is desirable and almost necessary that the hydrogen chloride be removed from these gas streams both because of the toxic nature of the HCL and to avoid pollution and because of the corrosive nature of HCL which poses problems in any off-gas cleanup system. It is recognized that corrosion by HCL is one of the major problems in waste incineration, corrosion by hydrogen chloride being an especially serious problem if water condenses anywhere in the system.

On particular area where polyvinyl-chloride plastics have posed a serious problem is in the disposal of low specific activity transuranic waste (LSA wastes), as PVC plastics constitute approximately 40% of the LSA wastes. The LSA wastes generated at the various sites at which work in the area of nuclear energy is conducted have in the past been disposed of in land burials. These wastes at present are being placed in above-ground storage at the Idaho National Engineering Laboratory located in southeastern Idaho pending determination of what and where a national transuranic waste repository shall be.

These wastes, typically composed of paper, plastic and metal refuse, are contaminated with minute quantities of alpha-emitting elements. While the hazard of direct radiation from this waste is insignificant, ingestion or inhalation of the toxic elements is extremely dangerous. Therefore, properly controlled disposal of such wastes is necessary to meet Federal standards as well as to protect the environment. Because of the volume of this waste generated annually, space for the controlled disosal is at a premium. Consequently, it is highly desirable to reduce the waste volume by compaction or incineration which produces a noncombustible waste. This is important for two reasons: (1) it is believed that when a national repository is defined, it will accept only noncombustible material; and (2) several of the waste contaminants (plutonium. zirconium, beryllium) are pyrophoric. Incineration reduces the fire hazards for engineered storage.

While incineration provides an attractive method for reducing the waste volume, in view of the high PVC plastic composition of the waste, corrosion of the flue gas duct work is a significant problem. Two possible courses of action are available to eliminate or substantially reduce the problem of hydrogen-chloride corrosion of the off-gas duct work. The PVC plastics can be segregated from the waste going to the incinerator or the hydrogen chloride produced by the incineration can be neutralized before it causes extensive corrosion. In terms of efficiency and expense, the second choice is clearly more practical.

Although the hydrogen chloride could be removed from the off-gases by wet-scrub techniques since wet-scrub equipment and process are reasonably well developed for industrial applications, a liquid waste would be generated by this method and in application of this to the incineration of LSA waste, this liquid waste would have to be solidified for the control of the radioactivity. This, of course, would require additional equipment consequently raise operating costs and difficulties.

Another potentially attractive method for hydrogen chloride abatement involves reacting the hydrogen chloride with ammonia. However, past methods employing ammonia have posed problems as there was no convenient or satisfactory method for collecting the ammonium chloride which was formed.

It is an object of the present invention to provide a method for the removal of hydrogen chloride from gas streams.

It is another object of the present invention to provide a method for removing hydrogen chloride from the off-gases generated during the incineration of polyvinly-chloride plastics.

A specific object of the present invention is to provide a method for removing hydrogen chloride from the off-gases produced during the incineration of radioactive contaminated polyvinyl-chloride plastics, which method provides for removal of the hydrogen chloride without generating large volumes of liquid wastes.

SUMMARY OF THE INVENTION

The present invention relates to a method of reducing the amount of hydrogen chloride contained in a gas stream. Ammonia gas is introduced into the gas stream containing the hydrogen chloride fo form a combined gas stream in which the ammonia and hydrogen chloride react in the gaseous phase to form ammonium chloride. The combined gas stream is passed into a condensation and collection vessel in which a cyclonic flow is created in the combined gas stream as it passes through the vessel. The temperature of the combined gas stream is reduced in the condensation and collection vessel to below the sublimation temperature of ammonium chloride. Ammonium chloride condenses on the walls of the vessel and the crystals so formed grow on the wall until the turbulence created by the cylonic flow breaks off the larger particles. The large particles are then driven by centrifugal and gravitational forces to the bottom of the vessel from which the accumulated ammonium chloride particles can be removed.

BRIEF DESCRIPTION OF THE DRAWING

Objects and advantages of the present invention will become apparent upon reading the following description and with reference to the drawing which is a schematic diagram illustrating the method of the present invention.

DESCRIPTION OF THE INVENTION

A more complete understanding of the features and operation of the method of the present invention will be gained upon consideration of the following description and with reference to the drawing. The present invention provides an attractive method for the abatement of hydrogen chloride which stated in the broadest general terms involves reacting ammonia with hydrogen chloride in the gas phase, condensing the solid ammonium chloride which is formed on a cool surface, and mechanically transferring the ammonium chloride out of the gas stream. The homogenous gas phase reaction:

$$NH_3(g) + HCL(g) \rightarrow NH_4Cl(s)$$

is diffusion controlled, and the degree of completeness is a function of temperature. Ammonium chloride, which sublimes directly into the separate species $NH_3$ and HCl, has a vapor pressure less than one mm Hg at temperatures below 160° C. It has been found that if adequate time is provided for condensation on an appropriate surface, it is possible to completely remove the hydrogen chloride as ammonium at or below 160° C.

The present invention can perhaps best be understood and appreciated by referring to the drawing in which is illustrated a schematic diagram of a hydrogen chloride abatement system for the practice of the method of the present invention.

A gas stream containing hydrogen chloride, such as may be generated from the incineration polyvinyl-chloride plastics for example, enters through conduit 11 and is combined with ammonia gas introduced into said gas stream at 12, the ammonia being introduced through conduit 13. The ammonia and the hydrogen chloride in the combined gas stream react in the gaseous phase to form ammonium chloride. It is preferred that the gaseous ammonia be fed into the gas stream containing the hydrogen chloride at a temperature above the sublimation temperature of ammonium chloride (i.e. 300° C). The combined gas stream is then passed into a condensation and collection vessel 14. A cyclonic flow is created in the combined gas stream as it passes through the condensation and collection vessel 14. One method for creating the cyclonic flow is to provide for the passing of the gas stream into a cylindrically-shaped condensation and collection vessel tangentially thereto. The tangential flow will create a cyclonic flow as the gas stream passes through the vessel. As the combined gas stream passes through the condensation and collection vessel, its temperature is reduced to 160° C or less. This reduction in temperature can be brought about in any of a variety of ways available, such as by heat exchange with the walls of the vessel. While the temperature can be reduced to a wide range of temperatures below 160° C, it has been found that cooling to about 150° C, such as by heat exchange with the vessel as the gas swirls to the outlet, is sufficient to cause ammonium chloride to condense on the walls of the vessel and therefore cooling to about 150° C is preferred. Satisfactory results are readily obtainable within the temperature range of 100-150° C. As the gas stream swirls through the vessel and is cooled, ammonium chloride crystals condense and grow on the walls of the cylinder. As these crystals reach a sufficiently large size the turbulence in the gas stream, created by the cyclonic flow, breaks off the large particles. These larger particles are in turn driven toward the bottom of the vessel by centrifugal and and gravitational forces. The ammonium chloride particles accumulate at the bottom of the vessel 15 from which the solid ammonium chloride product can be removed and collected for beneficial use. While the solid ammonium chloride product can be removed from the bottom 15 in accordance with any of many various techniques available and well known in the art, the drawing illustrates the product being removed through outlet 16 by mechanical auger means 17. However, it should be understood that the solid ammonium chloride product collected at the bottom of the vessel can be removed by other mechanical means in addition to the auger, such as star feeder, conveyor, etc.

The gas stream exits from the condensation and collection vessel 14 through conduit 18 and passes through a roughing filter in order to remove the finer particles which may be carried out of the condensation and collection vessel in the gas stream. As is illustrated in the drawing, the roughing filter can be a conventional cyclone 19. It should be understood that the roughing filter need not be a cyclone filter but can be any other type of filter, such as a bag-type roughing filter, etc. The finer particles which are removed from the gas stream by the roughing cyclone filter 19 are likewise collected such as at 20 and this solid product likewise can be recovered and put to beneficial use. The gas stream exiting from the cyclone 19 through conduit 21 can then be further cleaned prior to release to the environment such as by passing through HEPA (high efficiency particular air) filters 22.

Depending upon the initial composition of the gas stream, it may be desirable to provide for further off-gas cleanup. In any event, the gas stream exiting from HEPA filters 22 through conduit 23 is essentially free of hydrogen chloride, thus eliminating any problems from corrosion in further off-gas cleanup systems due to hydrogen chloride content.

The method for removing hydrogen chloride from a gas stream in accordance with the present invention offers several advantages over prior art techniques and particularly over any wet-scrub process. In particular, the gas phase reaction and particle collection in accordance with the present method offers the advantage of a volume and mass reduction in the waste material. Of particular importance is the fact that no liquid waste is generated which would require further treatment. This consideration is particularly important in dealing with the incineration of polyvinyl-chloride plastics which have been contaminated with radioactivity. In addition, a usable material is produced in the form of ammonium chloride, as the ammonium chloride so condensed and collected can be put to advantageous use. Another consideration pointing out an advantage of the present method is that no evaporation steps are required such that equipment and operating cost can therefore be reduced. If necessary, the ammonium chloride can be resublimed and condensed in order to separate it from contaminates in order to provide a more pure ammonium chloride product for beneficial use or disposal in conventional manners.

While the invention has been described in terms of a specific embodiment and with reference to a particular schematic illustration, the invention should not be limited to the specific embodiments or specific components described, but rather the invention should include alternatives, modifications and variations apparent to those skilled in the art and light of the description in which are embraced within the spirit and scope of the appended claims.

The embodiment of the invention in which an exclusive property or priviledge is claimed are defined as follows:

1. A method for the abatement of hydrogen chloride in a gas stream generated from the incineration of materials which include polyvinyl-chloride plastics comprising:

a. introducing ammonia gas into said gas stream containing the hydrogen chloride to form a combined gas stream wherein the ammonia and hydrogen chloride react to form ammonium chloride;

b. passing said combined gas stream into a condensation and collection vessel at a temperature above the sublimation temperature of ammonium chloride;

c. creating the cyclonic flow in said combined gas stream as it passes through said condensation and collection vessel;

d. reducing the temperature of said combined gas stream in said condensation and collection vessel to 160° C or less, whereby ammonium chloride crystals condense and grow on the walls of said vessel and turbulence created by said cyclonic flow breaks off larger particles which are driven to the bottom of said vessel; and e. removing the solid ammonium chloride particles from the bottom of said vessel.

2. The method in accordance with claim 1 further comprising passing the gas stream exiting from said condensation and collection vessel through a roughing filter.

3. The method of claim 2 wherein said roughing filter is a conventional cyclone filter.

4. The method of claim 2 wherein said filter is a bag-type roughing filter.

5. The method of claim 2 further comprising passing the gas stream exiting from said roughing filter through HEPA filters prior to its release to the environment.

6. The method of claim 1 wherein the temperature of said combined gas stream is reduced to 150° C.

* * * * *